United States Patent [19]

Henry

[11] Patent Number: 4,794,944

[45] Date of Patent: Jan. 3, 1989

[54] PLASTIC VALVE

[75] Inventor: Ralph E. Henry, Rixford, Pa.

[73] Assignee: Dresser Industries, Inc., Dallas, Tex.

[21] Appl. No.: 186,883

[22] Filed: Apr. 27, 1988

Related U.S. Application Data

[63] Continuation of Ser. No. 108,824, Oct. 14, 1987, Pat. No. 4,744,390.

[51] Int. Cl.⁴ .................. F16K 43/00; F16K 13/06; F16K 17/40
[52] U.S. Cl. .................... 137/312; 137/315; 137/797; 251/288; 251/309; 251/312; 251/341
[58] Field of Search .............. 137/312, 315, 797, 67, 137/68.1; 251/284, 286, 287, 288, 309, 312, 341, 368

[56] References Cited

U.S. PATENT DOCUMENTS

| | | | |
|---|---|---|---|
| 2,511,477 | 6/1950 | Mueller | 251/96 |
| 2,547,116 | 4/1951 | Gould | 251/103 |
| 2,604,293 | 7/1952 | Phillips | 251/103 |
| 2,621,886 | 12/1952 | Mueller | 251/95 |
| 2,642,257 | 6/1953 | Mueller et al. | 251/112 |
| 2,832,562 | 4/1958 | Myers | 251/175 |
| 3,057,370 | 10/1962 | Hamilton | 137/315 |
| 3,066,908 | 12/1962 | Floren et al. | 251/287 |
| 3,079,675 | 3/1963 | Bradbury | 29/157.1 |
| 3,168,280 | 2/1965 | Mueller | 251/217 |
| 3,185,179 | 5/1965 | Harautuneian | 137/625.47 |
| 3,257,096 | 6/1966 | Floren et al. | 251/287 |
| 3,350,057 | 10/1967 | Luckenbill | 251/312 |
| 3,434,691 | 3/1969 | Hamilton | 251/184 |
| 3,503,586 | 3/1970 | Bordes | 251/266 |
| 3,512,944 | 5/1970 | Craig et al. | 23/292 |
| 3,550,902 | 12/1970 | Pidgeon et al. | 251/151 |
| 3,552,439 | 1/1971 | Siver | 137/625.47 |
| 3,563,512 | 2/1971 | Hauffe | 251/312 |
| 4,003,403 | 1/1977 | Nehring | 137/625.41 |
| 4,015,816 | 4/1977 | Semon | 251/285 |
| 4,030,696 | 6/1977 | Bake | 251/288 |
| 4,072,161 | 2/1978 | Schoeneweis | 137/68 R |
| 4,073,314 | 2/1978 | Speelman | 137/625.47 |
| 4,113,228 | 9/1978 | Frye | 251/159 |
| 4,141,538 | 2/1979 | Bake et al. | 251/315 |
| 4,147,184 | 4/1979 | Jess | 137/625.47 |
| 4,217,933 | 8/1980 | Perry et al. | 137/625.47 |
| 4,219,046 | 8/1980 | West et al. | 137/375 |
| 4,257,575 | 3/1981 | Runyan | 251/292 |
| 4,262,880 | 4/1981 | Danko et al. | 251/288 |
| 4,319,735 | 3/1982 | Moen | 251/175 |
| 4,497,344 | 2/1985 | Kisiel | 137/797 |
| 4,511,120 | 4/1985 | Conley et al. | 251/288 |
| 4,519,414 | 5/1985 | Assya, Jr. | 137/246.22 |
| 4,531,537 | 7/1985 | Smith | 137/246.22 |
| 4,592,534 | 6/1985 | Veda et al. | 251/266 |
| 4,598,728 | 7/1986 | Ralet | 137/15 |
| 4,609,177 | 9/1986 | Turner et al. | 251/175 |

Primary Examiner—George L. Walton

[57] ABSTRACT

A service valve includes a valve body (12) having an upper chamber (18), a lower chamber (20), an open top end (22) and an open bottom end (24). The lower chamber (20) includes an inlet opening (26) and an outlet opening (28). A valve member (14) is disposed in the valve body (12) and is molded of plastic material to form a unitary body including a plug portion (36) having a flow passage (38) therethrough and an actuator portion (34). The plug portion (36) is rotatable in the valve body (12) between an open position where the flow passage (38) is aligned with the inlet (26) and outlet (28) openings and a closed position where the flow passage (38) is out of alignment with the inlet (26) and outlet (28) openings. The actuator portion (34) extends outwardly from the plug portion (36) through one of the chambers (18, 20). First (50) and second (51) seals act between the plug portion (36) and the valve body (12) for sealing against leakage from the inlet opening (26) and outlet opening (28). A third seal (72) is disposed between the valve body (12) and the actuator portion (34) for sealing against leakage into one of the chambers (18, 20). Locking structure (54) is disposed between the third seal (72) and one of the first (50) and second (51) seals for rotatably securing the valve plug (14) within the valve body (12).

12 Claims, 2 Drawing Sheets 4,794,944

PLASTIC VALVE

RELATED APPLICATION

This application is a continuation of U.S. patent application Ser. No. 07/108,824, filed Oct. 14, 1987, entitled "Plastic Valve," and now U.S. Pat. No. 4,744,390.

TECHNICAL FIELD

This invention relates to service valves, and more particularly to molded plastic rotary valves.

BACKGROUND OF THE INVENTION

Molded plastic valves are well known in the art. The increasing use of plastic pipe and tubing by gas utilities has made it necessary to seek improved valves for use with these plastic materials.

Rotary type valves have long been known and many modifications have occurred over the years. Of particular note is U.S. Pat. No. 4,511,120, issued Apr. 16, 1985, to Connelly, et al., and assigned to Kerotest Manufacturing Co. Service valves, such as a ball valve or a plug valve, of molded polyethylene material generally include a one-piece body having a valve seat with first and second passageways opening into the seat. A rotary member is positioned in the valve seat and passageway through the rotary member is movable between a closed position where the flow between the first and second passages of the valve body is blocked and an open position where the passage through the rotary member is aligned with the passages in the valve body to permit flow between the first and second passages through the rotary member. The rotary member is provided with seals which seal against the walls surrounding the valve body passages to shut off the flow through the passages when the rotary member is turned to the closed position.

In order to prevent leakage between the body and the rotary member, annular O-ring seals are utilized. It is also desirable to test the seal between these components under pressure prior to actual use of the valve. Previously developed valves have utilized an integral stem and plug arrangement where a stem extends upwardly from the plug and is connected to an adapter or nut for turning the stem. In such previously developed valves, the nut forms part of the seal for the valve, and therefore the nut must be installed prior to testing of the valve and seals for leakage. A need has thus arisen for a plastic service valve in which testing of the valve body and rotary member for leaks can be performed independently of additional structure which may form part of the valve and which would interfere with leakage detecting during testing. It is desirable that testing be accomplished with the rotary member in both the open and closed positions for a complete testing of the valve.

SUMMARY OF THE INVENTION

In accordance with the present invention, a service valve includes a valve body having an upper chamber, a lower chamber, an open top end and an open bottom end. The lower chamber includes an inlet opening and an outlet opening. A valve member is disposed in the valve body and is molded of plastic material to form a unitary body including a plug portion having a flow passage therethrough and an actuator portion. The plug portion is rotatable in the valve body between an open position where the flow passage is aligned with the inlet and outlet openings and a closed position where the flow passage is out of alignment with the inlet and outlet openings. The actuator portion extends outwardly from the plug portion through one of the chambers. First and second seals act between the plug portion and the valve body for sealing against leakage from the inlet opening and outlet opening. A third seal is disposed between the valve body and the actuator portion for sealing against leakage into one of the chambers. Locking structure is disposed between the third seal and one of the first and second seals for rotatably securing the valve plug within the valve body.

BRIEF DESCRIPTION OF THE DRAWINGS

For a more complete understanding of the present invention and for further advantages thereof, reference is now made to the following Description of the Preferred Embodiment taken in conjunction with the accompanying Drawings in which.

DESCRIPTION OF THE PREFERRED EMBODIMENTS

Figure 3:
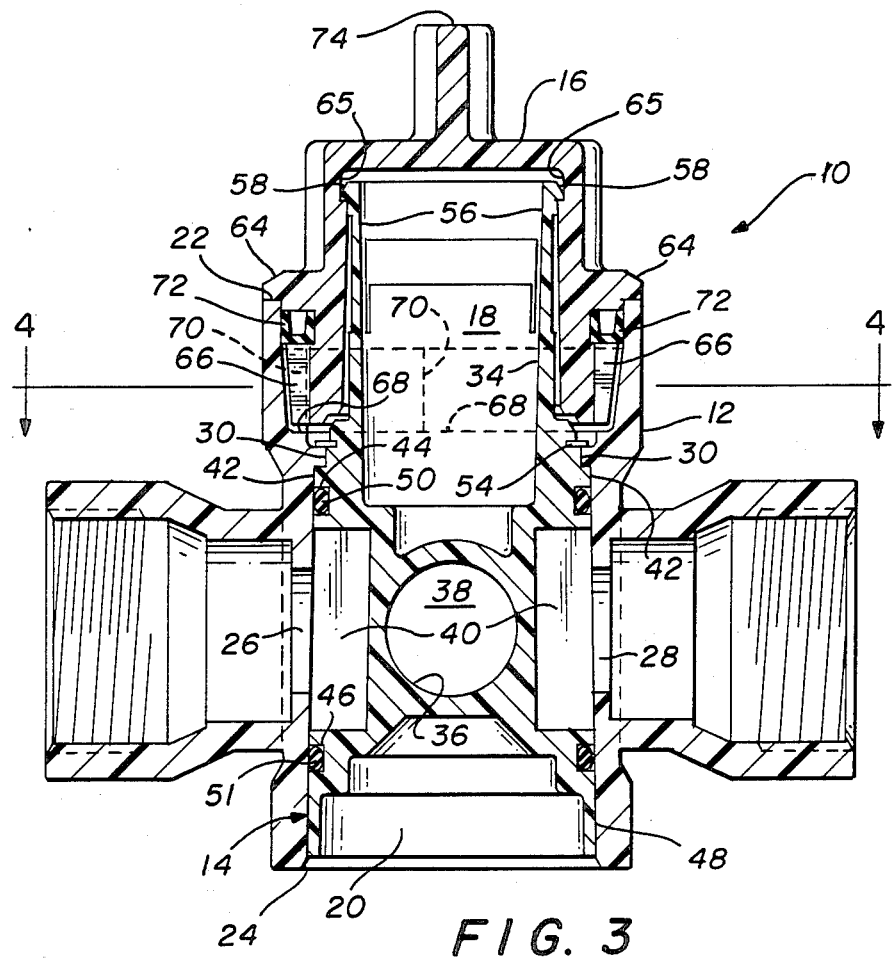
FIG. 3 is a cross-sectional view taken generally along sectional lines 3—3 of FIG. 1.
Figure 1:
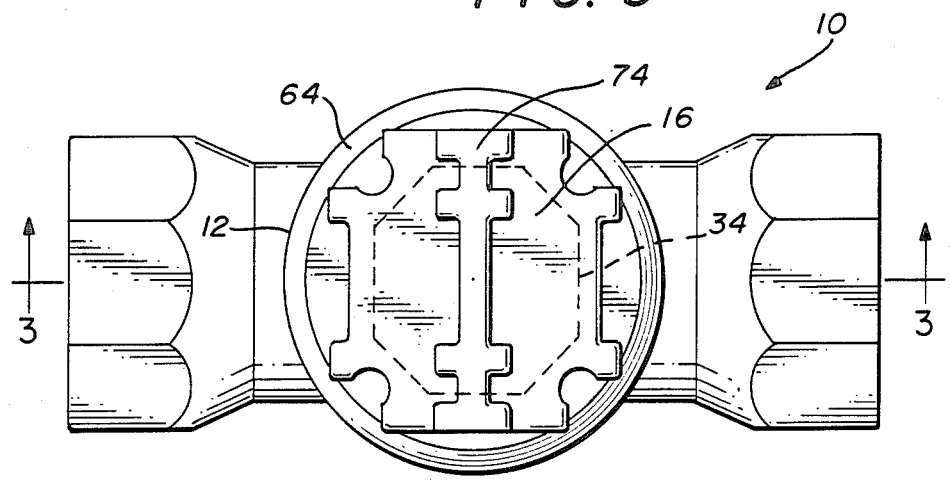
FIG. 1 is a top plan view of the valve of the present invention.

Referring simultaneously to FIGS. 1-4, a plastic service valve of the present invention is illustrated and is generally identified by reference numeral 10. Service valve 10 includes a valve body 12, a valve plug 14, and an operating nut 16, all composed of plastic material.

Valve body 12 has an upper chamber 18 and a lower chamber 20. Valve body 12 has an open top end 22 and an open bottom end 24 with the diameter at bottom end 24 being larger than the internal diameter at top end 22.

Lower chamber 20 includes an inlet opening 26 and an outlet opening 28. Upper chamber 18 includes a thrust seat 30 which is a circumferential protrusion positioned between the open top end 22 and the inlet 26 and outlet 28 openings in lower chamber 20.

Figure 2:
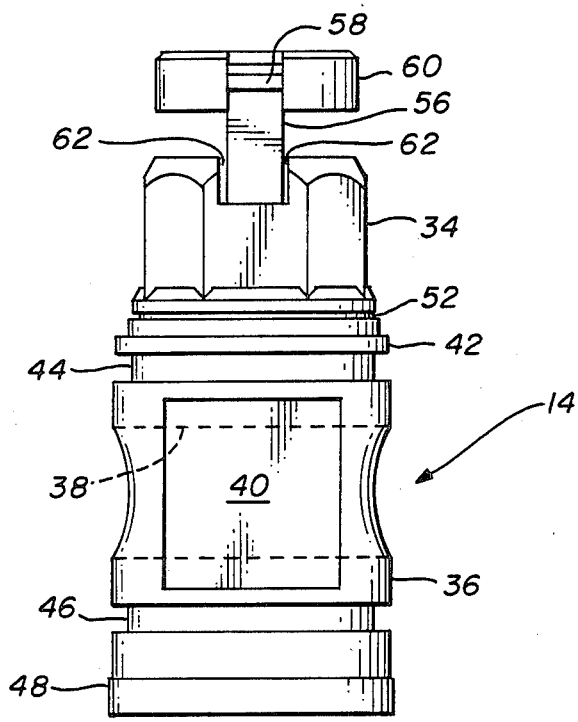
FIG. 2 is a side elevational view of the valve plug of the present invention.

As shown in FIGS. 2 and 3, valve plug 14 is inserted into valve body 12 through open bottom end 24 and positioned against thrust seat 30. Valve plug 14 is of molded plastic material forming a unitary body including an actuator portion 34 and a plug portion 36. Plug portion 36 has a flow passage 38 therethrough. Plug portion 36 is rotatable in thrust seat 30 between an open position where flow passage 38 is aligned with inlet 26 and outlet 28 and a closed position (as shown in FIG. 3) where flow passage 38 is out of alignment with inlet 26 and outlet 28.

In a preferred embodiment, plug portion 36 has counterbores 40 spaced oppositely one another and 90 from flow passage 38. A pair of spring-loaded sealing inserts (not shown) are positioned in counterbores 40 so that they engage lower chamber 20 around the inlet 26 and outlet 28 to prevent leakage when valve 10 is in the closed position as shown in FIG. 3. Plug portion 36 is preferably tapered to match the taper of valve body 12 and designed to have an interference fit.

Also in a preferred embodiment, plug portion 36 has a shoulder 42 for engagement with thrust seat 30. A groove 44 is located on plug portion 36 between shoulder 42 and flow passage 38. A groove 46 on plug portion 36 is located between flow passage 38 and valve plug skirt 48 of valve plug 14. Seals 50 and 51 are inserted in grooves 44 and 46, respectively, to prevent fluid leakage. An annular slot 52 (FIG. 2) is provided on plug portion 36 for insertion of a retaining ring 54. Retaining ring 54 secures valve plug 14 to valve body 12 by positioning thrust seat 30 between retaining ring 54 and shoulder 42.

Actuator portion 34 extends upwardly from plug portion 36 through upper chamber 18. In a preferred embodiment, actuator 34 has a pair of upwardly protruding latch fingers 56 which extend beyond the open top end 22 of upper chamber 18. Latch fingers 56 have ears 58 which are used in conjunction with operating nut 16 (as described below). Latch fingers 56 are positioned opposite one another and connected by a ring 60 (FIG. 2). Latch fingers 56 are cut into actuator 34 forming slots 62 on both sides of latch fingers 56. Slots 62 provide latch fingers 56 with greater flexibility.

Operating nut 16 fits over actuator 34. Operating nut 16 is designed to rotate to thereby rotate valve plug 14. Operating nut 16 has an external flange 64 designed to fit over and cover upper chamber 18 of valve body 12. Operating nut 16 has two slots 65 for latching engagement with latch fingers 56 of actuator portion 34.

Figure 4:
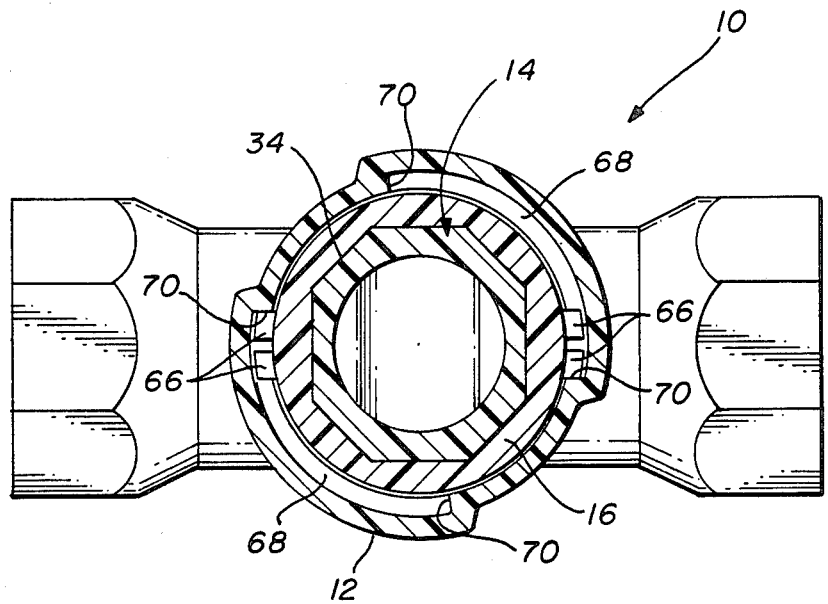
FIG. 4 is a cross-sectional view taken generally along sectional lines 4—4 of FIG. 3.

Referring now to FIGS. 3 and 4, in a preferred embodiment, operating nut 16 has two pair of oppositely facing lugs 66. Upper chamber 18 of valve body 12 has runs 68 for lugs 66 with stops 70 designed to allow operating nut 16 to be turned in one direction until one pair of lugs 66 contacts stops 70 and in the opposite direction until the other pair of lugs 66 contact stops 70. Lugs 66 are breakable to indicate overtorquing of operating nut 16. An airtight seal 72 (FIG. 3) is insertable between external flange 64 and lugs 66. Operating nut 16 includes a flow direction indicator 74 (FIG. 3).

An important aspect of the present invention is the locking structure between valve plug 14 and valve body 12 including thrust seat 30, shoulder 42 of valve plug 14 and retaining ring 54. This structure allows valve plug 14 and valve body 12 to be retained independently without the use of operating nut 16 which allows the present valve 10 to be pressure tested for leaks between valve plug 14 and valve body 12 during both the open and closed positions of valve 10. Once valve 10 has been tested, operating nut 16 can then be installed to the valve plug 14-valve body 12 combination. An additional aspect of the present invention is the interference fit between valve plug skirt 48 and valve body 12 which allows these components to function as a bottom seal for valve 10 to exclude foreign elements, such as, for example, dirt and water and to operate as a torque generator to provide an indication to the user of valve 10 of the operability of valve 10. An interference fit is also present between valve plug 14 and operating nut 16 at the interlocking actuator connection 34, which eliminates drive play for ultimate positioning accuracy.

Should the operator apply excessive torque to operating nut 16, the redundant lug 66 provides the operator with feedback that excessive torque is being applied should one of the lugs 66 break during rotation of operating nut 16. Even if one of the lugs of a pair of lugs 66 break, the redundant lug is still present to engage a stop 70 to assist the operator in knowing whether the valve 10 is in the open or closed position. The valve 10 is still operable even if both lugs 66 of the two pair of lugs break; however, stops 70 will no longer be engaged and operating nut 16 will be free to continuously rotate. Therefore, it can be seen that the present valve includes numerous advantages in operation and testing.

Although the present invention has been described with respect to a specific preferred embodiment thereof, various changes and modifications may be suggested to one skilled in the art and it is intended that the present invention encompass such changes and modifications as fall within the scope of the appended claims.

I claim:

1. A service valve comprising:
   a valve body having an upper chamber and a lower chamber, an open top end and an open bottom end;
   said lower chamber having an inlet opening and an outlet opening;
   a valve member disposed in said valve body;
   said valve member being molded of plastic material to form a unitary body including a plug portion and an actuator portion;
   said plug portion having a flow passage therethrough;
   said plug portion being rotatable in said valve body between an open position where said flow passage is aligned with said inlet and outlet openings and a closed position where said flow passage is out of alignment with said inlet and outlet openings;
   said actuator portion extending outwardly from said plug portion through one of said chambers;
   first and second seal means acting between said plug portion and said valve body for sealing against leakage from said inlet opening and said outlet opening;
   third seal means disposed between said valve body and said actuator portion for sealing against leakage into one of said chambers;
   locking means disposed between said third seal means and one of said first and second seal means for rotatably securing said valve member within said valve body and said third seal means being insertable into place after insertion of said locking means to permit pressure testing of said valve for leaks between said valve member and said valve body during either of said open and close positions independently of said third seal means.

2. The service valve of claim 1 and further including:
   an operating nut connected to said actuator portion for imparting rotational motion to said actuator portion.

3. The service valve of claim 2 and further including:
   means disposed on said operating nut for indicating the position of said plug portion with respect to said inlet and outlet openings.

4. A service valve comprising:
   a valve body having an upper chamber and a lower chamber;
   said upper chamber having a larger internal diameter than said lower chamber;
   said valve body having an open top end and an open bottom end;
   said lower chamber having an inlet opening and an outlet opening;
   a seat formed in said upper chamber between said open top end and said inlet and outlet openings in said lower chamber;
   a valve member having an external perimeter inserted into said valve body through said open bottom end and positioned against said seat;

said valve member being molded of plastic material to form a unitary body including a plug portion and an actuator portion;

said plug portion having a flow passage therethrough;

said plug portion being rotatable in said seat between an open position where said flow passage is aligned with said inlet and outlet openings and a closed position where said flow passage is out of alignment with said inlet and outlet openings;

said actuator portion extending outwardly from said plug portion through one of said chambers;

an operating nut for engaging said actuator portion for imparting rotational motion to said plug portion;

first and second seal means acting between said plug portion and said valve body for sealing against leakage from said inlet opening and said outlet opening;

third seal means disposed between said valve body and second actuator portion for sealing against leakage into one of said chambers;

locking means disposed on said valve member and adjacent said seat between said third seal means and one of said first and second seal means for locking said valve member within said valve body and said third seal means being insertable into place after insertion of said locking means to permit pressure testing of said valve for leaks between said valve member and said valve body during either of said open and close positions independently of said third seal means.

5. The service valve of claim 4 wherein said operating nut includes an external flange for covering said upper chamber of said valve body.

6. The service valve of claim 4 wherein said operating nut includes means for indicating the position of said plug portion with respect to said inlet and outlet openings.

7. The service valve of claim 4, wherein said plug portion further includes:
    counterbores spaced oppositely of one another and 90 degrees from said flow passage.

8. The service valve of claim 4, wherein said plug portion further includes:
    a shoulder for engagement with said seat;
    a top end adjacent to said actuator portion and a lower end adjacent to said open bottom end of said valve body;
    first and second annular grooves;
    said first annular groove being disposed between said shoulder and said flow passage;
    said second annular groove being disposed between said flow passage and said lower end of said plug portion;
    said first and second seal means being disposed in said first and second grooves, respectively; and
    an annular slot for receiving said locking means.

9. The service valve of claim 4, wherein said actuator portion further includes:
    a pair of upwardly protruding latch fingers which extend beyond said open top end of said valve body;
    said latch fingers being positioned opposite one another and being connected by a ring;
    said ring being spaced apart from said top end of said actuator portion; and
    said latch fingers being formed in said top end of said actuator portion with slots formed on both sides of each of said latch fingers.

10. The service valve of claim 4, further including:
    two pair of oppositely facing lugs located on said operating nut; and
    said upper chamber of said valve body having runs for said lugs including stops for allowing said operating nut to be turned in one direction until one pair of said lugs contact said stops and in the opposite direction until the other pair of said lugs contact said stops.

11. The service valve of claim 10 wherein said lugs are breakable to indicate excess rotational force exerted on said operating nut.

12. The service valve of claim 11 wherein said operating nut includes an external flange for covering said upper chamber of said valve body.

* * * * *